United States Patent Office 2,794,748
Patented June 4, 1957

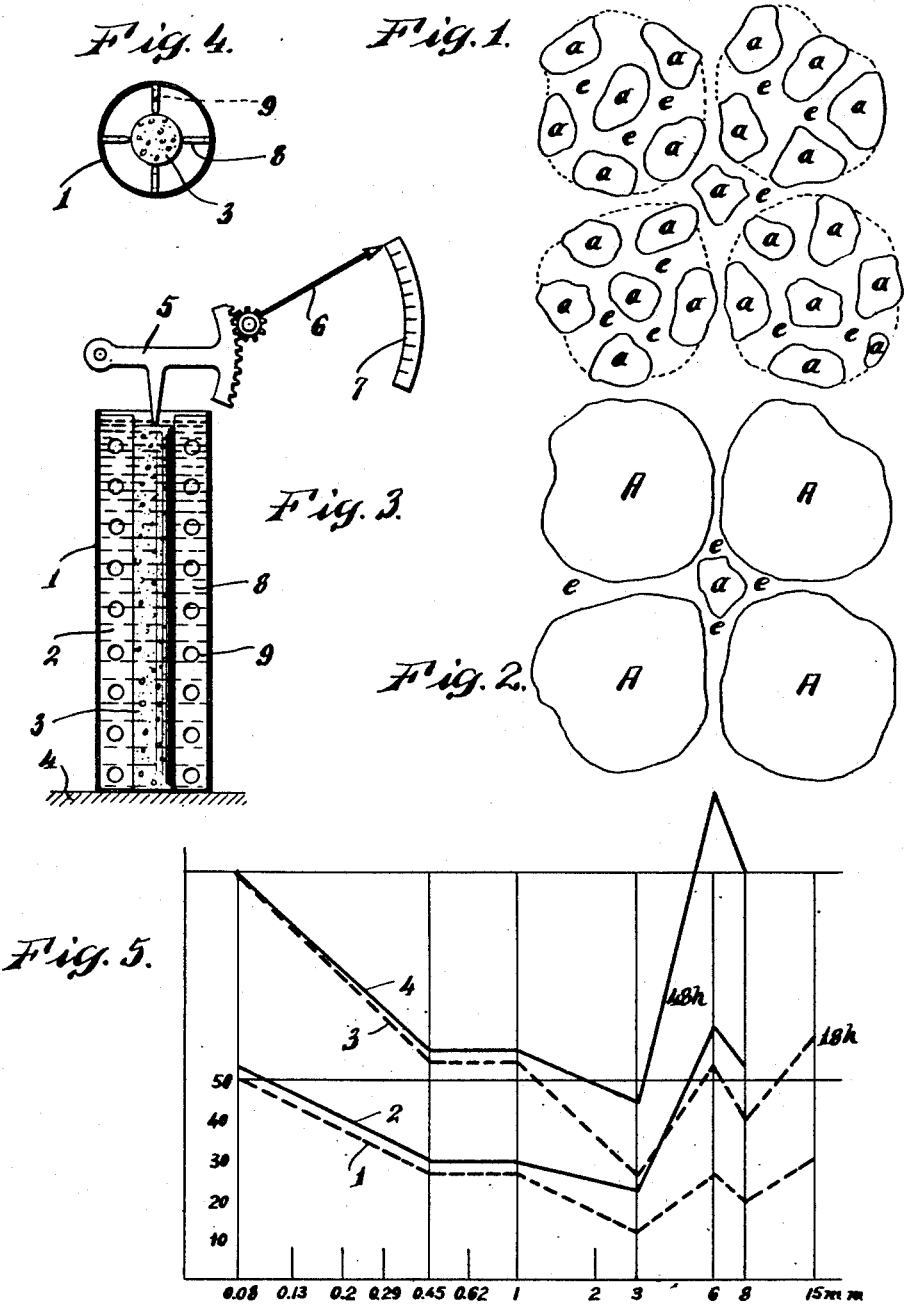

2,794,748

HYDRAULIC BINDING COMPOUNDS AND METHOD OF PRODUCING THE SAME

Georges Walter, Perroy, Switzerland

Application April 25, 1952, Serial No. 284,286

18 Claims. (Cl. 106—97)

The present invention relates to the production of hydraulic binding compounds, and is particularly directed to the production of a rapid hardening hydraulic binding compound having high initial and final strength, especially with respect to resistance to bending stresses, this application being a continuation-in-part of my co-pending application Serial No. 9,137, filed February 18, 1948, now abandoned.

The primary object of the present invention is to produce a rapid hardening hydraulic binding compound having high initial and final strength, especially with respect to resistance to bending stresses, and capable of withstanding any atmospheric conditions to which it may be exposed for indefinite periods of time without exhibiting any unsoundness or volume expansions of the order causing cracks or disintegration.

The tendency in cement manufacture has been to progressively increase the fineness of the particles so that, while in 1886 a residue of 10 percent on a sieve having 50 meshes per linear inch was not considered unreasonable, at present the normal cements are usually ground to specifications leaving a residue of 5 percent on a 170 mesh sieve and the rapid hardening cements to specifications leaving a residue of only 1 to 3 percent on the same 170 mesh sieve. Cements ground in accordance with these existing standards will hereinafter be referred to as finely ground cements. In using these known cements in producing concrete, high strength has been sought by increasing the proportion of the finely ground cement in the mixture. However, it has been found that there is an optimum proportion of cement that may be included in the mixture, usually between 600 and 800 kilograms per cubic meter, and exceeding this optimum proportion results in a decrease in the resistance or strength of the concrete. This decrease in resistance results from the heat and shrinkage produced by the gel developed at the surfaces of the cement grains. If the proportion of cement in the mixture is increased by the addition of finely ground particles or grains, the total surface area of the cement included in the mixture is increased and a quantity of gel is developed which produces excessive heat and shrinkage. Thus, the proportion of cement in the mixture may be increased beyond the above indicated optimum values to provide increased strength only if such increases do not excessively increase the total surface area of the cement grains and produce undesirable heat and shrinkage. It is apparent that the proportion of cement in the mixture may be increased without excessively increasing the total surface area of the cement grains by providing a cement which includes relatively large particles in addition to the now conventional finely ground cement grains.

However, the addition of relatively large particles to the finely ground cement grains raises a threat to the soundness or stability of the concerete which is much greater than the danger posed by the aforementioned development of heat and resultant shrinkage. This threat to the soundness or stability of the concrete arises from the action of calcium oxide or lime contained, in greater or lesser degree, within the relatively large particles. In the case of the very finely divided cement grains, any lime present in the clinkers from which the grains are ground will appear at the outer surfaces of the grains, the grains being sufficiently small so that no internal pockets may remain, and, therefore, the lime hydrates rapidly and the expansion or swelling produced by such hydration is completed before settling occurs. In the case of relatively large grains or particles of cement, the grains will be more or less porous and will contain more or less lime or calcium oxide some of which may be located in internal pockets of the particles, depending upon the size thereof and the properties of the clinker from which the large grains are formed. Thus, if the original clinker is extremely porous and contains substantial quantities of lime, relatively large grains or particles formed from such clinker will include internal pores or interstices containing substantial deposits of lime, and the hydration of this lime will proceed slowly and will continue to occur after the setting of the concrete has been completed thereby causing swelling and subsequent cracking or disintegration of the concrete.

Accordingly, it is an object of the present invention to provide a method for the production of a rapid hardening hydraulic binder having high initial and final strength, particularly with respect to its resistance to bending stresses, and made up of relatively large particles in addition to the conventional finely ground cement, wherein procedures are included for ensuring that the relatively large particles will not result in unsoundness by reason of the hydration of lime contained therein after setting of the binder has been completed.

In accordance with the present invention, an hydraulic binder for use in preparing concrete having a high resistance, particularly to bending, is produced by grinding a quantity of clinker to provide a finely divided cement, separately grinding more of the same clinker to provide relatively large particles having various sizes exceeding the sizes of the grains in the finely divided cement, passing the relatively large particles through sieves having openings of successively decreasing size to obtain segregated groups of relatively large particles having different size ranges, subjecting each of the groups of large particles to immersion in boiling water for a period of 200 hours, and mixing with cement formed from the same, or from similar, clinker relatively large particles formed from the same clinker and of the size range of that group which withstood the immersion in boiling water for 200 hours without exhibiting any unsoundness.

In the following description of specific embodiments of the present invention reference is to be had to the accompanying drawing wherein:

Fig. 1 is a diagrammatic representation of the arrangement of particles in an hydraulic binder produced in accordance with the concepts recognized as standard prior to the present invention;

Fig. 2 is a diagrammatic representation, similar to Fig. 1, but showing the arrangement of particles in an hydraulic binder produced in accordance with the present invention;

Fig. 3 is a side elevational view of a device that may be used in connection with a method embodying the present invention;

Fig. 4 is a horizontal sectional view taken through the device of Fig. 3; and

Fig. 5 is a graphic representation showing the extent of the swelling of variously sized particles.

As previously indicated, increasing the resistance to bending of mortars or concretes requires the increase of the proportion of cement in the mixture beyond the values which are now considered optimal. If the proportion of finely ground cement particles conforming to the existing standards, that is, particles ground to a fineness so that less than 5 percent remains on a 170 mesh sieve, is increased above the presently recognized optimal values of 600 to 800 kilograms per cubic meter, the total surface area of the cement particles increases to such an extent that the gel developed at the surface produces excessive heat and shrinkage. However, if the proportion of cement in the mixture is increased by substituting relatively large cement particles for some of the finely ground particles, the total surface area of the particles will be reduced and excessive heating and shrinkage will be avoided. Referring to Fig. 1, it will be seen that the small particles $a$ have a relatively great surface area at which large quantities of gel $e$ may be produced. When certain of the small particles $a$ of Fig. 1 are replaced by relatively large particles A, as in Fig. 2, the proportion of cement in the mixture can be increased, and the total surface area of the cement particles is maintained at an acceptable value so that only small quantities of gel $e$ are developed.

Thus, in providing an hydraulic binder having improved strength, particularly with respect to its resistance to bending stresses, it is essential first of all to recognize that the presently accepted optimum values for the proportion of cement in the mixture must be exceeded while avoiding excessive heating and shrinkage due to the development of gel and that these conditions may be satisfied by using relatively large particles as part of the cement. Further, such a cement must include, in addition to the relatively large particles, a substantial proportion of finely ground cement, ground according to existing specifications, in order to provide the desired rapid hardening properties and freedom from "bleeding."

Certain tests have heretofore been employed in determining or forecasting the soundness of cements which are finely ground in accordance with existing specifications. The most widely used of these tests are the Le Chatelier test and the "hot pat" test.

In the Le Chatelier test, the gauged cement is poured into a longitudinally split tube or cylinder provided with two needles which diverge as the cylinder is forced open by the swelling or expansion of the material contained therein. After the cylinder has been filled, it is immersed in water at 15° centigrade for twenty-four hours to complete the setting of the cement. The distance between the needles is then measured and the cylinder replaced in cold water which is brought to 100° centigrade within half an hour and is then kept boiling for three hours. Previously, the boiling was continued for six hours, but the present practice is to reduce the period to the extent indicated above. After cooling, the distance between the two needles is again measured, and the difference between the first measurement and the last mentioned measurement represents the expansion or swelling of the cement. According to accepted standards this difference must not exceed 10 mm. when first tested, and if this value is exceeded the cement may be spread out and aerated for seven days, after which the expansion must not exceed 5 mm.

In the "hot pat" test, the cement is gauged to a plastic paste and formed on a glass plate into pats about 3 inches in diameter and ½ inch thick at the center and tapering to a thin edge. The pats are kept in a moist atmosphere for 24 hours and then heated in steam at 100° centigrade or boiling water for 3 to 5 hours. Unsoundness is shown by the appearance of distortion, cracking or disintegration.

In determining the soundness or unsoundness of finely ground cements, the above described tests are adequate. Since the particles are all very small in size, any lime contained in the cement will appear at the surface of the particles and will not be contained in pores or interstices within the particles. Thus, the accelerated tests, described above, will produce the hydration of the exposed lime during the respective short periods of 3 hours or 3 to 5 hours and any expansion or swelling will be completed during those periods.

However, I have found that certain cements containing finely ground particles, in accordance with existing specifications, and relatively large particles added thereto will, when subjected to the Le Chatelier or "hot pat" tests, appear to be sound, but will nevertheless crack and disintegrate when subjected to adverse atmospheric conditions for extended periods. Such delayed cracking or disintegration results from the expansion or swelling produced by hydration of the lime contained in the pores or interstices within the relatively large particles. The lime in such pores or interstices is not affected by the boiling for 3 to 5 hours, as in the above described tests, and, therefore, such tests are unreliable in determining the soundness of cements including large particles.

If cements are to be produced having relatively large particles therein to achieve improved resistance, particularly to bending, it is apparent that such cements, to be of any value, must be sound and capable of withstanding exposure to adverse atmospheric conditions for indefinite periods. Thus, the large particles added to the finely ground cement must not have quantities of occluded lime sufficient to cause unsoundness over such indefinite periods. I have found that the quantity of occluded lime, or lime contained in pores or interstices, in the relatively large particles will depend upon the properties of the clinker from which such large particles are produced and the size of the relatively large particles. Thus, if the clinker is porous, as distinguished from compact, and contains excessive quantities of lime, it is probable that relatively large particles formed from that clinker will have pores therein containing lime which will produce expansion after setting. The lime contained in such pores may be exposed by further breaking down the large particles until the resulting particles are substantially compact. When the clinker used is substantially porous and contains relatively large deposits of lime, the usable particles, while larger than the grains in finely ground cement, cannot be as large as the usable particles that are formed from compact and relatively lime free clinker.

Since it is desirable to employ the largest particles that may be used from a particular clinker or batch of clinkers having the same characteristics without resulting in unsoundness, the present invention provides a process for producing a rapid hardening hydraulic binder having improved resistance, particularly to bending, which includes adding relatively large particles to finely ground cement and establishes procedures permitting the addition of the largest possible particles while ensuring against the occurrence of unsoundness by reason of the action of lime trapped within the large particles. In accordance with the present invention, and contrary to the accepted view that a treatment in boiling water for 3 to 5 hours without the appearance of excessive expansion, distortion, cracking or disintegration, as in the Le Chatelier or "hot pat" tests, proves the soundness of a cement, I have found that these short test periods are wholly inadequate to indicate the unsoundness of particles which are substantially coarser than the usual finely ground rapid-hardening cements, and that a reliable and safe indication of the soundness of such large or coarse particles is obtained only when the test period is increased drastically to endure for 10 to 16 or more times the period heretofore considered suitable.

By way of example, a number of test bars were made up. One test bar was composed entirely of a finely ground cement that was indicated to be sound by the conventional "hot pat" test. The remaining test bars were formed of equal parts of the sound finely ground cement and of relatively large grains ranging in size from 0.088 mm. up to 15.0 mm. and formed from the same or similar clinkers used in producing the finely ground cement. That is, one of the composite bars included relatively large particles ranging in size from 0.08 mm.

to 0.13 mm., another bar had relatively large particles ranging in size from 0.13 mm. to 0.20 mm., and so forth in suitable steps up to 15.0 mm. These test bars were exposed for 24 hours to moist air to permit setting and then immersed in a bath of water which was brought to a boil in a manner similar to the "hot pat" test. After 5 hours of boiling, all of the bars were intact and exhibited no distortion or cracking. The boiling was then continued up to 200 hours, with observations being made at 6 hour intervals. It was found that the bar having the largest particles included therein cracked after 48 hours and all of the bars containing particles larger than 1.0 mm. cracked or disintegrated by the end of 100 hours. Between the 100th and 200th hours no further changes were observed thereby indicating that cement containing relatively large particles no greater than 1.0 mm., for example, particles ranging in size from 0.2 to 1.0 mm., would be sound for indefinite periods.

Repeating the above procedure with finely ground cement and relatively large particles of varying sizes formed from different clinkers, it was found that the maximum size of relatively large particles usable without producing failure during the 200 hour boiling period varied for the different clinkers. Using the information obtained as indicated above sample concrete structures were fabricated for each of the clinkers used in the experiments and formed of finely ground cement, finely ground cement and large particles of sizes indicated to be sound, and finely ground cement and large particles of sizes indicated to be unsound. It was found that the concrete structures formed of the finely ground cement combined with the relatively large particles indicated to be sound exhibited bending and compressive strengths far exceeding the corresponding characteristics of the concrete structure formed of the finely ground cement alone. Further, after 6½ years of exposure to the atmosphere, the sample concrete structures formed of finely ground cement combined with relatively large particles indicated to be sound have in no case exhibited any signs of unsoundness, while the corresponding sample structures including large particles indicated to be unsound have, over the same period, disclosed cracks and other signs of unsoundness.

particles having various sizes exceeding the sizes of the grains in the finely divided cement, segregating the relatively large particles to obtain groups of relatively large particles having different size ranges, subjecting the finely ground cement and each of the groups of large particles to a medium enhancing the swelling thereof for a period sufficient to effect the complete swelling of the particles, and mixing with the finely ground cement relatively large particles formed from the same or similar clinker and of the size range of that group which exhibited no unsoundness during subjection to said medium.

As a specific example of the above method, I present the following:

Finely ground initial high resistance commercial cement and a quantity of clinkers, corresponding to that from which the cement was formed, were obtained from the same source. The clinkers were ground in a conventional ball mill until relatively large particles ranging in size up to 15.0 mm. were obtained. By passing the ground clinkers through a series of sieves having progressively decreasing mesh openings, the ground clinkers were segregated into seven groups of particles having respective ranges of sizes as follows: 0.08 to 0.13; 0.13 to 0.2; 0.2 to 0.45; 0.45 to 1.0; 1.0 to 3.0; 3.0 to 8.0; and 8.0 to 15.0 mm.

Each of the segregated groups of relatively large particles was mixed with finely ground cement, in the proportion of 50 percent by weight of cement and 50 percent by weight of the relatively large particles, and gypsum was added in quantities inversely proportional to the size of the relatively large particles, as shown on Table I below. Each mixture had water added thereto to obtain a plastic consistency.

Two prismatic test pieces were formed in molds for each of the above mixtures and for the finely ground cement alone, and the dimensions of each test piece were 4 x 4 x 16 cm. The setting of the test pieces occurred at normal temperatures and humidity for a period of 24 hours. The test pieces were then immersed in water which was heated to boiling and the boiling continued for 200 hours. The results of this subjection to boiling water for 200 hours are summarized below:

TABLE I

| Mixture | Proportions, Cement to Particles, Percent By Weight | Sizes of the Particles, mm. | Addition of Gypsum, Percent of Particles | No. of Test Pieces | Observed Results |
| --- | --- | --- | --- | --- | --- |
| A | 100-0 |  | 0 | 2 | All of these test pieces withstood the boiling for 200 hours without exhibiting any distortion, cracking or other signs of unsoundness. |
| B | 50-50 | 0.08- 0.13 | 1.3 | 2 | |
| C | 50-50 | 0.13- 0.20 | 0.8 | 2 | |
| D | 50-50 | 0.20- 0.45 | 0.4 | 2 | |
| E | 50-50 | 0.45- 1.00 | 0.2 | 2 | |
| F | 50-50 | 1.00- 3.00 | 0.1 | 2 | |
| G | 50-50 | 3.00- 8.00 | 0.0 | 2 | |
| H | 50-50 | 8.00-15.00 | 0.0 | 2 | One test piece showed slight cracks after 96 hours and the other test piece showed similar cracks after 120 hours, and both test pieces were disintegrated after 200 hours. |

Thus, it was established that the addition of relatively large particles to the finely ground cement can produce an hydraulic binder having improved resistance, particularly to bending, and that, in producing such a binder, special procedures must be employed in providing large particles that will avoid unsoundness. Generally, the method or process according to one embodiment of the present invention for producing a rapid hardening hydraulic binder having improved resistance, particularly to bending, includes the steps of grinding a particular clinker to provide finely divided cement in accordance with existing standards, that is, leaving no more than 5 percent on a 170-mesh sieve, separately grinding more of the same or similar clinker to provide relatively large Having established that no unsoundness will result from the addition of particles ranging in size up to 8.0 mm., such particles are then mixed with the finely ground cement in sufficient quantity so that the relatively large particles constitute at least 15 percent by weight of the mixture. In specific examples of this mixture, relatively large particles were added to the finely ground cement so that the particles larger than 0.2 mm. but smaller than 8.0 mm. represented 60 percent of the total mixture, with 56 percent of such particles having sizes ranging between 1.0 and 3.0 mm. Such specific mixtures were then formed into samples some of which were vibrated and some of which were merely hand shaken into the molds. After 3 days of aging, the hand shaken samples showed binding strengths of approximately 200 kg./cm.$^2$, and the vibrated samples showed binding strengths of approximately 250 kg./cm.$^2$. After 7 days of aging, the hand shaken samples showed binding strengths of approximately 210 kg./cm.$^2$, while the vibrated samples showed binding strengths of approximately 320 kg./cm.$^2$. In compression, all of the samples withstood approximately 1000 kg./cm.$^2$, after only 3 days of aging, and the vibrated samples, after 7 days of aging, withstood compressive stresses of approximately 1300 kg./cm.$^2$.

While the samples were boiled for 200 hours in the above described method and showed no further changes after 100 hours, it is to be noted that the boiling does not have to be continued for 200 hours in all cases. Thus, if the samples show no further changes after 60 hours, for example, it will be sufficient to continue the boiling for an additional 100 hours, that is, for a total period of 160 hours, in order to ensure a perfectly reliable indication of the soundness of the relatively large particles.

I have further found that an accelerated procedure may be employed for determining the maximum size of relatively large particles that can be added to the finely ground cement without producing unsoundness. In accordance with this other embodiment of the invention, clinker is ground to provide finely divided cement in accordance with existing standards. More of the same clinker is separately ground to provide relatively large particles of various sizes exceeding the sizes of the grains in the finely ground cement. The relatively large particles are then segregated to obtain groups of different size ranges and samples are formed of the finely ground cement alone and of mixtures of the finely ground cement with each of the groups of relatively large particles. After the samples have set, their lengths are measured, and then the samples are subjected to a medium enhancing the swelling thereof, for example, boiling water, for a period of at least 48 hours. After the termination of this period, all of the samples are again measured and it will be noted that the samples containing progressively larger particles up to a certain size expanded progressively less than the sample containing only the finely ground cement, and that the samples containing particles larger than the above mentioned certain size expanded more than the sample containing only the finely ground cement. Finally, a rapid hardening hydraulic binder having improved resistance, particularly to bending, is produced by adding relatively large particles, having sizes up to the value which was indicated to produce no greater expansion than the finely ground cement alone, to a quantity of the finely ground cement.

Extensive experiments and observations have shown that the sizes of the large particles that may be added to finely ground cement without producing unsoundness as determined from the accelerated boiling test for 48 hours and the comparative measurements of the expansion, as above, correspond in each case to the allowable sizes of the relatively large particles as determined by the boiling for 200 hours without measurement, as previously set forth.

As a specific example of the second described method of producing an hydraulic binder, I present the following:

Finely ground initial high resistance commercial cement and a quantity of clinkers, corresponding to that from which the cement was formed, were obtained from the same source. The clinkers were ground in a conventional ball mill until relatively large particles ranging in size up to 15.0 mm. were obtained. The large particles were segregated into six groups having different ranges of sizes as follows: 0.20 to 0.45; 0.45 to 1.0; 1.0 to 3.0; 3.0 to 6.0; 6.0 to 8.0; and 8.0 to 15.0. Such segregation was obtained by passing the large particles through a series of sieves having mesh openings of progressively decreasing sizes. Each of the segregated groups of relatively large particles was mixed with finely ground cement in equal proportions by weight, with gypsum being added in quantities decreasing substantially inversely with respect to the increasing particle size. Water was then added to each mixture to obtain a plastic consistency.

Three prismatic test pieces were formed in molds for each of the above described mixtures and for the finely ground cement alone, and the dimensions of each test piece were 4 x 4 x 16 cm. The test pieces were permitted to set for 24 hours at normal temperatures and humidity. After setting, each test piece was stripped from its mold and placed in a device of the kind shown in Figs. 3 and 4. Such device includes a container 1 for water 2 having radially extending ribs 8 formed with perforations 9 to position the test piece 3 at the center of the container. A pivoted feeler 5 is mounted above container 1 and engages the top of the test piece. The feeler 5 may have a gear segment thereon meshing with a gear holding a pointer 6 which cooperates with a calibrated scale 7 to indicate expansion of the test piece. After the test pieces are placed in the above described devices, the readings of the pointers 6 on scales 7 are noted, and the water in the containers is brought to a boil by suitable heaters (not shown). The boiling continues for at least 48 hours and the scale indications are recorded for at least the 18th and 48th hours.

The results of the above described steps are summarized as follows:

TABLE II

| Mixture | Sizes of Particle and Percent By Weight | Expansion After 18 Hours | | | | Expansion After 48 Hours | | | |
|---|---|---|---|---|---|---|---|---|---|
| | | Test Piece | | | Average Expansion (Microns) | Test Piece | | | Average Expansion (Microns) |
| | | 1 | 2 | 3 | | 1 | 2 | 3 | |
| A | 100%—0.0 to 0.08 mm | 50 | 60 | 40 | 50 | 50 | 60 | 50 | 53 |
| B | 50%—0.0 to 0.08; 50%—0.2 to 0.45 | 20 | 30 | 30 | 27 | 20 | 30 | 40 | 30 |
| C | 50%—0.0 to 0.08; 50%—0.45 to 1.0 | 30 | 20 | 30 | 27 | 30 | 20 | 40 | 30 |
| D | 50%—0.0 to 0.08; 50%—1.0 to 3.0 | 10 | 10 | 20 | 13 | 20 | 20 | 30 | 23 |
| E | 50%—0.0 to 0.08; 50%—3.0 to 6.0 | 20 | 30 | 30 | 27 | 30 | 110 | 50 | $^1$ 63 |
| F | 50%—0.0 to 0.08; 50%—6.0 to 8.0 | 20 | 30 | 11 | 20 | 70 | 40 | 50 | $^1$ 53 |
| G | 50%—0.0 to 0.08; 50%—8.0 to 15.0 | 30 | 40 | 20 | 30 | 50 | ---- | 30 | ($^2$) |

$^1$ Without distortion, cracking or disintegration visible to the naked eye.
$^2$ With cracking and disintegration visible to the naked eye.

The recordings set forth in Table II are presented graphically in Fig. 5 wherein the ordinates are the expansion readings and the abscissas represent the sizes of the particles. Line 1 represents the expansion of the test pieces after 18 hours and line 2 represents the expansion of the same test pieces after 48 hours. Line 3 represents the expansion of the test pieces containing relatively large particles as compared with the expansion of the test pieces formed only of the finely ground cement, and having no particles or grains larger than 0.08 mm., after 18 hours, while line 4 shows the same comparison after 48 hours.

In accordance with the second embodiment of the invention, the particles which, when added to the finely ground cement, will not result in unsoundness, are those which did not swell or expand more than the cement alone.

From the results summarized above, it follows that a sound hydraulic binder having improved resistance, particularly to bending, may be provided in accordance with the invention by adding relatively large particles, up to sizes of less than 6.0 mm., to the finely ground cement.

While the foregoing examples have added the relatively large particles to finely ground cement made from the same clinker, it should be noted that the finely ground cement may be formed from other clinker so long as the cement is sound.[1] But in this case the accelerated boiling test for a period of 48 hours cannot be performed exactly as hereinbefore described. Specifically, the largest particles which can then be safely used are those of a size corresponding to a minimum value of the obtained curve, for beyond that size the swelling increases indefinitely and not in comparison with the finely ground cement. Further, the dimensions given for the test pieces are not critical. Numerous empirical tests have shown that the above described comparative method of determining the largest particles safely included in the mixture greatly decreases the time required for effecting such a determination, and serves to indicate, in the shortened period, the upper limit of the particle size which would be capable of withstanding the boiling test for a period of 200 hours without exhibiting unsoundness and in this way the definitive soundness of the resulting concrete.

Another method of producing an hydraulic binder having improved resistance, particularly to bending, requires, as before, the provision of finely ground cement and segregated groups of relatively large particles having different size ranges and produced from the same or similar clinker. A test piece is then prepared from a mixture of the finely ground cement and particles having the full range of sizes included in all of the groups. If this test piece proves to be unsound when submitted to the boiling test for 200 hours, then another test piece is prepared from a mixture of the finely ground cement and all of the groups of the relatively large particles with the exception of that group having the largest particles. This second test piece is then subjected to the boiling test. If the second test piece fails then a third test piece, omitting the next largest group of relatively large particles, is prepared. This step-by-step process continues until the maximum particle size which will be indefinitely sound has been determined.

While the times given for the various tests described above are preferable when employing boiling water as the medium enhancing the swelling of the test pieces, these times may be shortened by a treatment at temperatures higher than 100° centigrade, as with steam or boiling water under an increased pressure. In any event, the duration of the treatment will be such that further treatment produces no further change in the test pieces, and the required duration will vary as a function of the temperature and pressure. When the temperature and pressure are increased, the time of setting of the test pieces may be increased beyond the conventional 24 hours.

Since the size of the relative large particles that may be safely added to the cement without producing unsoundness varies depending upon the porosity and lime content of the clinkers from which such particles are formed, it is apparent that certain clinkers, which are extremely porous and contain or form too much lime, must be ground to the size of finely ground cement, that is, grains smaller than 0.08 mm. to avoid unsoundness. Such undesirable clinkers will be usable, if at all, in forming the relatively large particles to be added to the finely ground cement, only after the burning of the clinkers is intensified slightly above normal without producing a harmful degree of vitrification.

However, in all cases I have found that the sizes of the large particles that may be added without producing unsoundness will be increased, to enhance the improvement in the bending strength of concretes or neat cements formed therefrom, by preparing the clinkers to be used for the relatively large particles in the manner hereinafter set forth.

For finely ground cement, it is sufficient that the clinker removed from the rotary furnace have an apparent density of 2.55 to 2.65, while the actual density of this material is approximately 3.1. The difference between the apparent and actual densities results from the numerous pores which are enclosed within the compact parts of the clinkers. When the clinker is finely ground, none of the resulting grains are large enough to enclose any of such pores and any lime contained in the pores is exposed and substantially hydrated during the grinding operation. When the clinker is only roughly crushed to produce the relatively large or coarse particles, the various pores are not all broken through, and lime contained or formed later in such pores can become the center of subsequent destructive expansion. Accordingly, it is preferable that the clinker, employed in connection with the present invention, be baked in a manner to provide larger compact areas, between the pores that may be included therein, than those previously considered necessary in the production of finely ground cement. This may be achieved by increasing the baking or burning period or by the addition of any suitable fluxing agents, which are well known, or by a combination of the two. By employing these procedures, clinkers may be obtained at the outlet of the furnace having apparent densities exceeding 2.65.

Further, when the clinker is crushed in order to form the coarse or relatively large particles, the apparent density may be further increased by a prolonged treatment in a ball mill using relatively little balls so that the compact pieces are not broken up which the relatively porous portions of the clinkers are broken down and separated from the compact pieces. The apparent density of the relatively large particles obtained in this manner may be elevated to the desired value of at least 2.90.

Using large particles prepared as above and the methods previously described for determining the maximum size that may be added to the finely ground cement without producing unsoundness, the maximum advantages of the present invention may be achieved.

It goes without saying that, if the maximum resistance to bending obtainable in the above described manner exceeds the practical requirements of a particular application, it may be more economical to use relatively large particles which are smaller than the maximum permissible size indicated by the testing of the samples.

The proportions of the relatively large particles added to the finely ground cement are in accordance with the rules which are well known to workers in the art for forming compact mortars and concretes. That is, the greater the difference between the sizes of the largest added particles and the grains of the finely ground concrete, the greater the quantity of relatively large particles that are added; and the smaller the above mentioned difference, the smaller is the quantity that is added. However, in order to produce any appreciable increase in the resistance to bending, it is necessary that the relatively large particles be greater than .2 mm., and that the quantity of such particles added form at least 15 percent of the total weight of the mixture. In order to obtain maximal strength in bending, the added relatively large particles should include particles of 1.0 or more millimeters and, in certain cases, as much as 10.0 mm.

An hydraulic binder produced in the manner described

---

[1] But in this case the accelerated boiling test for 48 hours can not be performed exactly as hereinbefore described. The large particles can then be used until the size corresponding to a minimum of the obtained curve after which the swelling increases indefinitely, and not in comparison with the finely ground cement.

above may be composed of finely ground Portland clinker and coarsely ground Portland clinker, or in certain cases of finely ground aluminous clinker mixed with coarsely ground aluminous clinker. Further, the hydraulic binder may be formed of finely ground particles and relatively large particles produced from Portland clinker along with relatively large particles produced from aluminous clinker, and in such a case the surface area of the aluminous particles must be less than 10 percent, and preferably less than 5 percent, of the total active surface area of the entire mixture to provide the desired rate of setting. The setting time of the mixtures formed entirely of finely ground and relatively large particles formed from Portland clinker is regulated by the addition of gypsum as is well known.

Further, the bending strength is enhanced, in accordance with the present invention, by removing needles or splinters from and rounding the edges of the relatively large particles added to the finely ground cement. The large particles should in no case be spherical, but merely devoid of sharp edges, and this may be achieved by treating the particles, after they have been crushed to the desired size, in a ball mill having a weak or small charge of balls.

It is apparent that the relatively large particles may be added to the finely ground cement either at the plant or at the point of use.

While I have described various illustrative embodiments and examples of the present invention, it is to be understood that the invention is not limited thereby and that various changes and modifications may be effected therein without departing from the scope of the invention which is intended to be defined in the appended claims.

What I claim is:

1. A method of producing a rapid-hardening hydraulic binder having a high resistance, particularly to bending, comprising crushing clinkers separately to obtain finely ground cement and relatively large particles, segregating said relatively large particles into groups of particles having different size ranges, forming test pieces from the finely ground cement alone and from mixtures each of which includes said finely ground cement and particles from a respective one of said groups, exposing the test pieces, after hardening, to a medium enhancing the expansion thereof for a period sufficient to complete the expansion thereof, and adding to the finely ground cement relatively large particles at most as large as the largest particles in the largest of said groups which withstood exposure to said medium without exhibiting distortion and cracking.

2. The method of making a cementitious product possessing the properties of rapid-hardening and high strength, particularly with respect to bending; comprising grinding cement clinker material to the normal fineness of finished cement alone so that less than 5 percent would remain on a 170 mesh sieve, separately grinding cement clinker material to materially coarser sizes than the first mentioned ground material and having as their upper limit sizes which are capable, after hardening for 24 hours at room temperatures and atmospheric pressures, of withstanding exposure to boiling water for 200 hours at atmospheric pressure without exhibiting distortion and cracking, and intimately mixing the coarser cement material made up of particles at most as large as the greatest size particles withstanding the boiling water for 200 hours without exhibiting distortion and cracking with the cement material ground to the fineness of finished cement.

3. The method according to claim 2 wherein said clinker material ground to the fineness of finished cement is Portland cement clinker and the cement clinker material ground to materially coarser sizes includes aluminous clinkers; the surface area of the coarser cement material formed of said aluminous clinkers and added to the cement material ground to the fineness of finished cement being less than 10 percent of the total surface area of the mixture.

4. The method according to claim 2, including the step of rounding-off the sharp edges of the particles of the coarser cement material prior to the mixing thereof with the cement material ground to the fineness of finished cement.

5. The method according to claim 2, including adding gypsum to the mixture in proportion to the surface area of the coarser cement material for controlling the setting time of the mixture.

6. The method of making a cementitious product possessing the properties of rapid-hardening and high strength, particularly with respect to bending; comprising grinding cement clinker to produce grains of the fineness of finished cement, separately crushing cement clinker to destroy the more porous parts thereof to the extent that the remaining compact portions of the clinkers have an apparently density higher than 2.90, grinding the compact portions to provide particles of materially coarser sizes than said grains, segregating said particles of materially coarser sizes into groups of particles having different size ranges, forming test pieces from the finely ground cement and from mixtures each of which includes particles from a respective one of said groups, exposing said test pieces after hardening to boiling water for a period of 200 hours, and intimately mixing said finely ground grains with those particles of materially coarser sizes having an upper limit corresponding at most to the sizes of the largest particles included in the test pieces which withstood exposure to the boiling water without exhibiting distortion and cracking.

7. The method according to claim 6, including adding at least one fluxing agent to the clinker ground to produce the particles of materially coarser sizes during the baking thereof.

8. A method of producing a rapid hardening hydraulic binder having a high resistance, particularly to bending, comprising crushing clinkers separately to obtain finely ground cement and relatively large particles, segregating said relatively large particles into groups of particles having different size ranges, forming test pieces from the finely ground cement alone and from mixtures each of which includes said finely ground cement and particles from a respective one of said groups, exposing the test pieces, after hardening, to boiling water for 200 hours, and adding to the finely ground cement relatively large particles at most as large as the largest particles in the largest of said groups which withstood exposure to the boiling water for 200 hours without exhibiting distortion and cracking.

9. A method of producing a rapid-hardening hydraulic binder having a high resistance, particularly to bending, comprising separately crushing clinkers to obtain finely ground cement and relatively large particles, segregating said relatively large particles into groups of particles having different size ranges, forming test pieces from the finely ground cement alone and from mixtures each including particles from a respective one of said groups, exposing the test pieces, after hardening, to a medium enhancing the expansion thereof for a period sufficient to produce hydration of any lime contained in the interior of the relatively large particles, measuring the expansion of said test pieces during exposure to said medium, selecting those test pieces which the measurements show to expand as little as the test pieces formed of the finely ground cement alone, and adding particles at most as large as those included in the selected test pieces to the finely ground cement.

10. A method of producing a rapid-hardening hydraulic binder having high resistance, particularly to bending, comprising separately crushing clinkers to obtain finely ground cement and relatively large particles, segregating said relatively large particles into groups of particles having different size ranges, forming test pieces from the finely ground cement alone and from mixtures each including particles from a respective one of said groups, exposing the test pieces, after hardening, to boiling water for a period of at least 48 hours, measuring the expansion of said test pieces during exposure to said medium, selecting those test pieces which the measurements show to expand as little as the test pieces formed of the finely ground cement alone, and adding particles at most as large as those included in the selected test pieces to the finely ground cement.

11. A method according to claim 10, wherein said relatively large particles added to the finely ground cement have dimensions of 0.2 to 3.0 mm.

12. A method according to claim 11, wherein the quantity of relatively large particles added to the finely ground cement is at least 15 percent by weight of the combined weight of the relatively large particles and the finely ground cement.

13. The method of making a cementitious product possessing the properties of rapid-hardening and high strength, particularly with respect to bending; comprising separately crushing clinkers to obtain finely ground cement less than 0.2 mm. and relatively large particles, segregating said relatively large particles into groups of particles having different size ranges, forming test pieces from the finely ground cement and from mixtures each of which includes particles from a respective one of said groups, exposing said test pieces to the atmosphere for 24 hours to permit the hardening thereof, exposing the hardened samples to boiling water at atmospheric pressure for a period of at least 48 hours, measuring the expansion of said test pieces during exposure to said medium, selecting those test pieces which the measurements show to expand as little as the test pieces formed of the finely ground cement alone, and adding particles at most as large as those included in the selected test pieces to the finely ground cement.

14. The method of making a cementitious product possessing the properties of rapid-hardening and high strength, particularly with respect to bending; comprising separately crushing clinkers to obtain finely ground cement and relatively large particles, segregating said relatively large particles into groups of particles having different size ranges, forming test pieces from the finely ground cement alone, and from mixtures each of which includes particles from a respective one of said groups, exposing said test pieces after hardening to a moist medium under pressure and at a temperature greater than 100° centigrade enhancing the expansion of said test pieces for a period sufficient to complete the expansion of the test pieces, measuring the expansion of said test pieces during exposure to said medium, selecting those test pieces which the measurements show to expand as little as the test pieces formed of the finely ground cement alone, and adding particles at most as large as those included in the selected test pieces to the finely ground cement.

15. The method of making cementitious product possessing the properties of rapid-hardening and high strength, particularly with respect to bending; comprising grinding cement clinker material to the fineness of finished cement, separately grinding cement clinker material to a materially coarser size than the first mentioned ground material, forming a test piece prepared from mixture of the finally ground cement and coarser particles having the full range of sizes, and another test piece containing finely ground cement and coarser particles having the full range of sizes minus the largest particles contained in the first named test piece and so on step by step up to the less large particles of the considered coarser grains, submitting after hardening the choiced series of test pieces to boiling water for 200 hours establishing which test pieces remain without distortion or cracking; mixing finely ground cement with the full range of coarser particles of which the maximum particles size corresponds at most at the maximum size included in the test piece containing the largest grains having withstood said test without exhibiting distortion or cracking.

16. A method according to claim 1, wherein the quantity of relatively large particles added to the finely ground cement is at least 15 percent by weight of the combined weight of the finely ground cement and the relatively large particles.

17. A method according to claim 2, wherein the relatively large particles added to the finely ground cement are greater than 0.2 mm. in size.

18. A method according to claim 1, wherein the grains of the finely ground cement have sizes ranging up to maximum 0.08 mm.

References Cited in the file of this patent

FOREIGN PATENTS

| | | |
|---|---|---|
| 653,839 | Great Britain | Oct. 12, 1951 |
| 242,119 | Switzerland | Apr. 30, 1946 |
| 653,839 | Switzerland | Oct. 12, 1951 |

OTHER REFERENCES

Lea and Desch: "The Chemistry of Cement and Concrete" (1935), pp. 218–219.